US012620126B1

(12) United States Patent
Nixon et al.

(10) Patent No.: US 12,620,126 B1
(45) Date of Patent: May 5, 2026

(54) APPARATUS AND METHOD OF GRID-ORIENTED NORMALIZATION FOR ANALYSIS OF SPHERICAL AREAS FROM 2-D IMAGE

(71) Applicant: United States of America as represented by the Administrator of NASA, Washington, DC (US)

(72) Inventors: Conor A. Nixon, Greenbelt, MD (US); Zachary Yahn, Columbia, MD (US); Douglas Trent, Hamtpon, VA (US); John Santerre, Berkeley, CA (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 268 days.

(21) Appl. No.: 18/236,467

(22) Filed: Aug. 22, 2023

(51) Int. Cl.
| | |
|---|---|
| *G06K 9/00* | (2022.01) |
| *G06T 7/11* | (2017.01) |
| *G06T 7/13* | (2017.01) |
| *G06T 7/33* | (2017.01) |
| *G06T 7/73* | (2017.01) |

(52) U.S. Cl.
CPC .................. *G06T 7/73* (2017.01); *G06T 7/11* (2017.01); *G06T 7/13* (2017.01); *G06T 7/33* (2017.01); *G06T 2200/24* (2013.01)

(58) Field of Classification Search
CPC ...... G06F 16/29; G06F 16/9537; G06F 3/013; G06F 3/017; G06F 3/0304
See application file for complete search history.

(56) References Cited

U.S. PATENT DOCUMENTS

| | | | |
|---|---|---|---|
| 11,927,965 B2 * | 3/2024 | Ebrahimi Afrouzi | ......................... G06F 3/04845 |
| 2008/0065685 A1 * | 3/2008 | Frank | ...................... G06F 16/29 707/999.102 |
| 2012/0033852 A1 * | 2/2012 | Kennedy | ............ G06V 10/7715 382/103 |
| 2016/0120457 A1 * | 5/2016 | Wu | ...................... A61B 5/7435 600/411 |
| 2017/0293635 A1 * | 10/2017 | Peterson | ............. G06F 16/2477 |
| 2020/0166312 A1 * | 5/2020 | King | ................... H04N 1/32309 |
| 2020/0177789 A1 * | 6/2020 | Sheinin | ................ H04N 25/531 |
| 2022/0148153 A1 * | 5/2022 | Zhu | ......................... G06T 3/073 |

* cited by examiner

*Primary Examiner* — Hadi Akhavannik
(74) *Attorney, Agent, or Firm* — Heather Goo; Matthew F. Johnston; Trenton J. Roche

(57) ABSTRACT

The present invention includes a system which determines feature metrics on a spherical surface, the system disposed at a client/server, including: a grid generation engine which generates a grid according to user configuration; a feature segmentation engine which digitizes a two-dimensional image of the spherical surface containing the feature and determines a feature location in the image, a grid overlay and enumeration engine which determines a position of the grid relative to the feature and overlays the grid onto the image to determine grid cell overlap and coverage; and a feature parameterization engine which performs analysis of the covered cells to obtain the metrics of the feature for the user; where the metrics includes a total area, a centroid, moments of inertia, a perimeter, a major axis, a compactness, an orientation, an XY bounding box, a major axis bounding box, an XY aspect ratio and a major axis aspect ratio.

19 Claims, 4 Drawing Sheets

APPARATUS AND METHOD OF GRID-ORIENTED NORMALIZATION FOR ANALYSIS OF SPHERICAL AREAS FROM 2-D IMAGE

ORIGIN OF THE INVENTION

The invention described herein was at least in-part made by an employee of the United States Government and may be manufactured or used by or for the Government of the United States of America for governmental purposes without the payment of any royalties thereon or therefor.

BACKGROUND OF THE INVENTION

1. Field of the Invention

The present invention relates to an apparatus and method of grid-oriented normalization for analysis of spherical areas—or the parameterization of features on spherical surfaces—from a 2-dimensional (2-D) image of the spherical surface (i.e., in the form of a photograph or satellite image). The present invention utilizes a predetermined grid of equal-area cells to enable the accurate and automated characterization of features on a spherical surface such as the celestial sphere or a planet or a moon, given the 2-D image. The present invention determines feature properties including feature area, centroid, moments of inertia, perimeter, compactness, major axis, bounding box, aspect ratio and North-South orientation.

2. Description of the Related Art

Longitude and latitude are a widely used coordinate system for defining location on the surface of Earth and other astronomical bodies. An equivalent coordinate system of right ascension and declination is used from the inside of the sphere looking out, to define location on the celestial sphere. Longitude and latitude lines would seem to be a candidate for determining area, since they do form a cartesian grid of cells across the entirety of a sphere's surface. However, as lines of longitude converge at the poles, the area inscribed by their approaching lines becomes increasingly smaller. Cells formed by equally spaced lines of latitude and longitude do not have equal area across the sphere.

Further, viewed in a photograph, a sphere appears as a two-dimensional (2-D) disk. The perceived area of a surface feature, observed in terms of 2-D image pixels, becomes increasingly distorted as the feature extends in any direction from the center of the disk towards the disk horizon. In particular, the perceived area of the feature shrinks towards the horizon becoming zero at the edge or limb of the disk. For large-scale features on the surface of a sphere that extend across such an expanse of distortion, computing area and other measurements can be difficult.

In outer space missions, there is a need to characterize features on the spherical surface of planets and moons, such characterization including the overall area of the feature, its center, its moments of inertia, its perimeter, its compactness, its major axis, its bounding box, its aspect ratio, and its North-South orientation. Accurate assessment of these measures from a "flat" 2-D image is a challenge, since the scale of distance observed at the center of a spherical object distorts in any direction towards the horizon.

Thus, a method and apparatus to address for the above challenges are desired.

SUMMARY OF THE INVENTION

The present invention relates to an apparatus and method of grid-oriented normalization for analysis of spherical areas—or the parameterization of features on spherical surfaces—from a 2-dimensional (2-D) image of the spherical surface (i.e., in the form of a photograph or satellite image). The present invention utilizes a predetermined grid of equal-area cells to enable the accurate and automated characterization of features on a spherical surface such as a planet or a moon, given the 2-D image. The present invention determines feature properties including feature area, centroid, moments of inertia, perimeter, compactness, major axis, bounding box, aspect ratio and North-South orientation.

In one embodiment, a system which determines a plurality of metrics of a feature on a spherical surface, the system being disposed at one of a client computer or a server, includes: a grid generation engine which generates a grid according to a user configuration; a feature segmentation engine which digitizes a two-dimensional image of the spherical surface containing the feature and determines a location in the image where the feature resides, a grid overlay and enumeration engine which determines a position of the grid relative to the feature and overlays the grid onto the image to determine grid cell overlap and coverage; and a feature parameterization engine which performs analysis of the covered cells to obtain the plurality of metrics of the feature which are displayed to a user.

In one embodiment, the system further includes: a graphical user interface (GUI) accessed by a user; a configuration engine which collects specification data from the user on grid configuration and selects the grid; and a grid generation engine which utilizes data from the configuration engine and determines equal-area per cell of the grid, and a definition of cell boundaries in latitude and longitude in said grid.

In one embodiment, the grid overlay and enumeration engine includes: a grid alignment analyzer which determines the position of the grid relative to the feature for each row and column of cells in the grid utilizing the cell boundaries in longitude and latitude from the grid generation engine, and overlays the grid onto the image; an overlap assessor which examines each of the cells in the grid to assess how much each of the cells interacts with a feature mask which determines the location in the image where the feature resides; and a cell coverage analyzer which records the grid cell overlap or coverage in a format to implement the analysis and determination of the plurality of metrics of the feature by the specialized feature parameterization engine.

In one embodiment, the feature parameterization engine includes: an area analyzer which receives inputs from an area/cell analyzer of the grid generation engine, and receives inputs from the cell coverage analyzer on grid cell coverage, to determine the equal-area per cell of the grid, and a total area of the feature.

In one embodiment, the feature parametrization engine further includes: a plurality of sub-components to which data on the grid cell coverage from the cell coverage analyzer is provided, including: a centroid generator which utilizes data from the area analyzer and data from the cell coverage analyzer to determine a centroid as a first-order spatial moment of a center of mass of the feature in latitude and longitude; a perimeter analyzer which utilizes data from the cell coverage analyzer and isolates perimeter cells of a perimeter of the feature and determines externally facing sides of the perimeter cells, to determine a perimeter; an XY bounding box outliner which utilizes data from the perimeter analyzer to outline a bounding box on the X and Y dimensions of the feature; a major/minor axis identifier which utilizes data from the perimeter analyzer to identify a major axis which includes a longest line segment that connects two points on the perimeter of the feature, and a minor axis which includes a longest line segment perpendicular to the major axis that connects two of the perimeter cells; and an orientation renderer which utilizes the data on the major axis from the major/minor axis identifier, to determine a feature orientation in degrees.

In one embodiment, the system further includes: a moment of inertia generator which measures a second-order spatial moment of the feature, normalized by the centroid determined by the centroid generator, to generate moments of inertia along the X and Y axes.

In one embodiment, the system further includes: a compactness analyzer which utilizes data on the total area from the area analyzer and data from the perimeter analyzer to determine compactness as a measure of a minimization of the perimeter to contain a maximum area.

In one embodiment, the system further includes: an XY aspect ratio analyzer which utilizes data from the XY bounding box outliner and determines a ratio of width to height of the bounding box.

In one embodiment, the system further includes: a major axis bounding box outliner which utilizes data from the perimeter analyzer and the major/minor axis identifier and determines a width and an orientation of the bounding box, and a height of the bounding box equal to the sum of two maximum perpendicular segments above and below a major axis.

In one embodiment, the system further includes: a major axis aspect ratio analyzer which determines an aspect ratio utilizing data from the major axis bounding box outliner, by dividing the width of the bounding box by the height of said bounding box obtained from the major axis bounding box outliner.

In one embodiment, the feature parameterization engine further includes: a feature metrics analyzer which receives data directly from the area analyzer, the moment of inertia generator, the compactness analyzer, the XY aspect ratio analyzer, the major axis bounding box outliner, and the major axis aspect ratio analyzer; and wherein the feature metrics analyzer receives data directly from the area analyzer, the centroid generator, the perimeter analyzer, the XY bounding box outliner, the major/minor axis identifier, and the orientation renderer; and wherein the feature metrics analyzer analyzes all data from the moment of inertia generator, the compactness analyzer, the XY aspect ratio analyzer, the major axis bounding box outliner, the major axis aspect ratio analyzer, the centroid generator, the perimeter analyzer, the XY bounding box outliner, the major/minor axis identifier, and the orientation renderer, to determine the plurality of metrics of the feature.

In one embodiment, the system further includes: a data storage which stores all data from the feature parameterization engine including the feature metrics analyzer, and from the configuration engine, the grid generation engine, the feature segmentation engine, and the grid overlay and enumeration engine.

In one embodiment, the plurality of feature metrics includes at least the total area, the centroid, moments of inertia, the perimeter, the major and minor axis, the compactness, the orientation, the XY bounding box, the major axis bounding box, the XY aspect ratio, and the major axis aspect ratio.

In one embodiment, the system further includes: a display; and a results generator which formats the plurality of feature metrics from the feature metrics analyzer and displays them on the display for the user.

In one embodiment, the system configuration engine includes: a GUI dashboard that receives and displays specification data from the user utilizing the GUI, the specification data which includes feature parameters and grid requirements; a parameter analyzer which analyzes the specification data by the user to determine the grid configuration; and a regime selector which generates the grid based on the grid configuration.

In one embodiment, the grid generation engine includes: an area/cell analyzer which determines the equal-area per cell for the grid; and a longitude/latitude boundaries generator which determines longitude and latitude for each row and columns of cells in said grid.

In one embodiment, the system further includes: a feature acquisition engine including: a sensor that takes said two-dimensional image of the spherical object; a remote sensor platform on which the sensor is disposed; and a data storage device which stores the image.

In one embodiment, the covered cells are selected to be square at a particular latitude.

In one embodiment, a method of determining a plurality of metrics of a feature on a spherical surface, includes: generating a grid according to a user configuration utilizing a grid generation engine; digitizing a two-dimensional image of the spherical surface containing the feature using a feature segmentation engine, and determining a location in the image where the feature resides, determining a position of the grid relative to the feature utilizing a grid overlay and enumeration engine, which determines and overlays the grid onto the image to determine grid cell overlap and coverage; and performing an analysis of the covered cells using a feature parameterization engine, to obtain the plurality of metrics of the feature which are displayed to a user; wherein the plurality of metrics includes at least a total area, a centroid, moments of inertia, a perimeter, a major axis, a compactness, an orientation, an XY bounding box, a major axis bounding box, an XY aspect ratio and a major axis aspect ratio, of the feature.

In one embodiment, a computer system which automatically determines a plurality of metrics of a feature on a spherical surface, includes: at least one memory having at least one program which includes the steps of: generating a grid according to a user configuration utilizing a grid generation engine; digitizing a two-dimensional image of the spherical surface containing the feature using a feature segmentation engine, and determining a location in the image where the feature resides, determining a position of the grid relative to the feature utilizing a grid overlay and enumeration engine, which determines and overlays the grid onto the image to determine grid cell overlap and coverage; and performing an analysis of the covered cells using a feature parameterization engine, to obtain the plurality of metrics of the feature which are displayed to a user; wherein the plurality of metrics includes at least a total area, a centroid, moments of inertia, a perimeter, a major axis, a compactness, an orientation, an XY bounding box, a major axis bounding box, an XY aspect ratio and a major axis aspect ratio, of the feature; and at least one processor configured to run the program.

Thus, some features consistent with the present invention have been outlined in order that the detailed description thereof that follows may be better understood, and in order that the present contribution to the art may be better appreciated. There are, of course, additional features consistent with the present invention that will be described below, and which will form the subject matter of the claims appended hereto.

In this respect, before explaining at least one embodiment consistent with the present invention in detail, it is to be understood that the invention is not limited in its application to the details of construction and to the arrangements of the components set forth in the following description or illustrated in the drawings. Methods and apparatuses consistent with the present invention are capable of other embodiments and of being practiced and carried out in various ways. Also, it is to be understood that the phraseology and terminology employed herein, as well as the abstract included below, are for the purpose of description and should not be regarded as limiting.

As such, those skilled in the art will appreciate that the conception upon which this disclosure is based may readily be utilized as a basis for the designing of other structures, methods, and systems for carrying out the several purposes of the present invention. It is important, therefore, that the claims be regarded as including such equivalent constructions insofar as they do not depart from the spirit and scope of the methods and apparatuses consistent with the present invention.

BRIEF DESCRIPTION OF THE DRAWINGS

The description of the drawings includes exemplary embodiments of the disclosure and are not to be considered as limiting in scope.

DESCRIPTION OF THE INVENTION

The present invention relates to an apparatus and method of grid-oriented normalization for analysis of spherical areas—or the parameterization of features on spherical surfaces—from a 2-dimensional (2-D) image of the spherical surface (i.e., in the form of a photograph or satellite image). The present invention utilizes a predetermined grid of equal-area cells to enable the accurate and automated characterization of features on a spherical surface such as the celestial sphere or a planet or a moon, given the 2-D image. The present invention determines feature properties including feature area, centroid, moments of inertia, perimeter, compactness, major axis, bounding box, aspect ratio and North-South orientation.

More particularly, the present invention relates to a novel method of constructing a grid of equal-area cells that, when superimposed on the surface of a sphere, allows the automated measurement of features such as clouds, ice rafts, or craters when used in planetary missions. The present invention is unique in its use of a cartesian grid (i.e., every grid row has the same number of columns) that lends itself well to computational matrices and data frames.

Figure 1A:
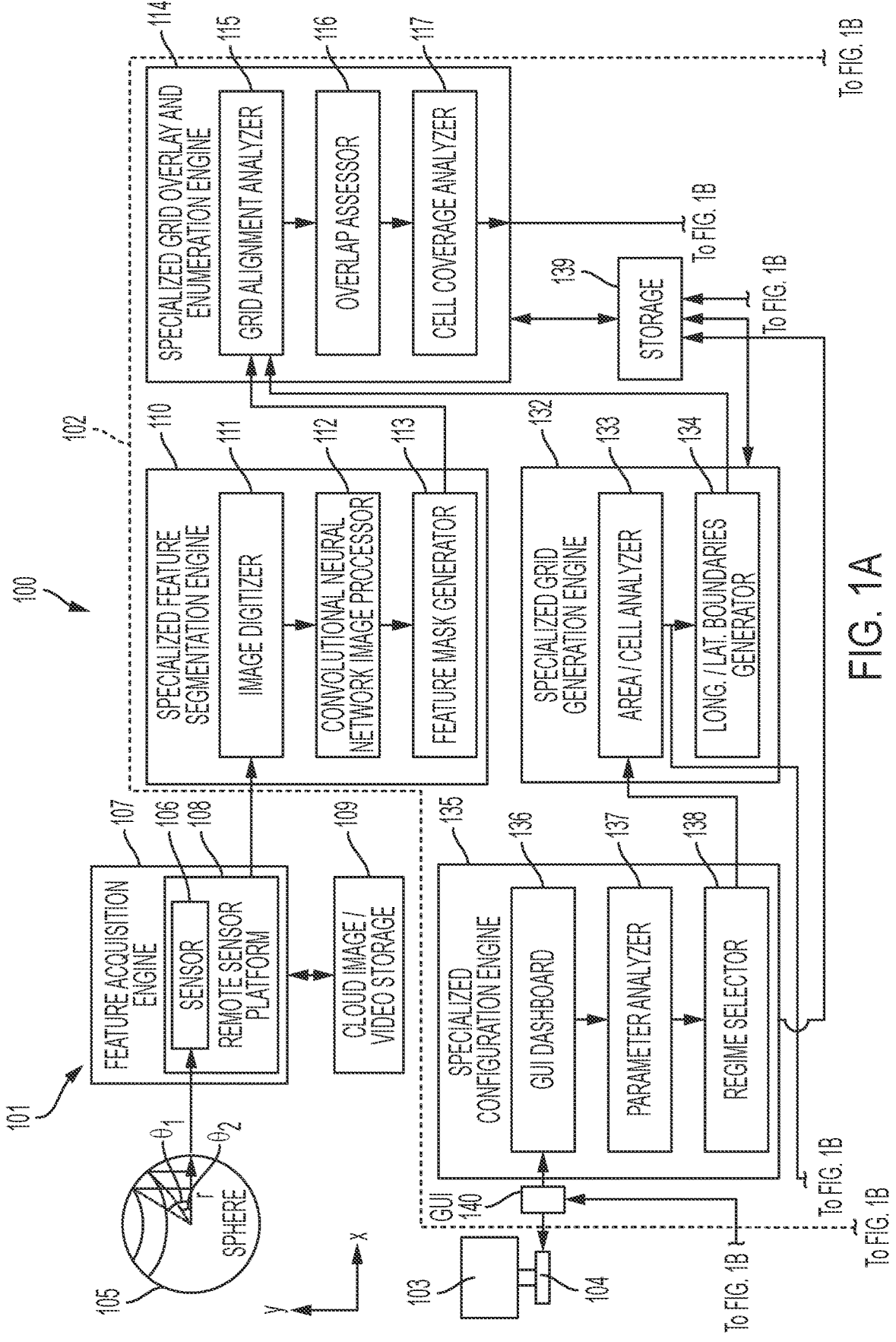
FIGS. 1A and 1B shows a layout of the major operational engines and modules that determine the parameterization of features on spherical surfaces based on a 2-D image, according to one embodiment consistent with the present invention.
Figure 1B:
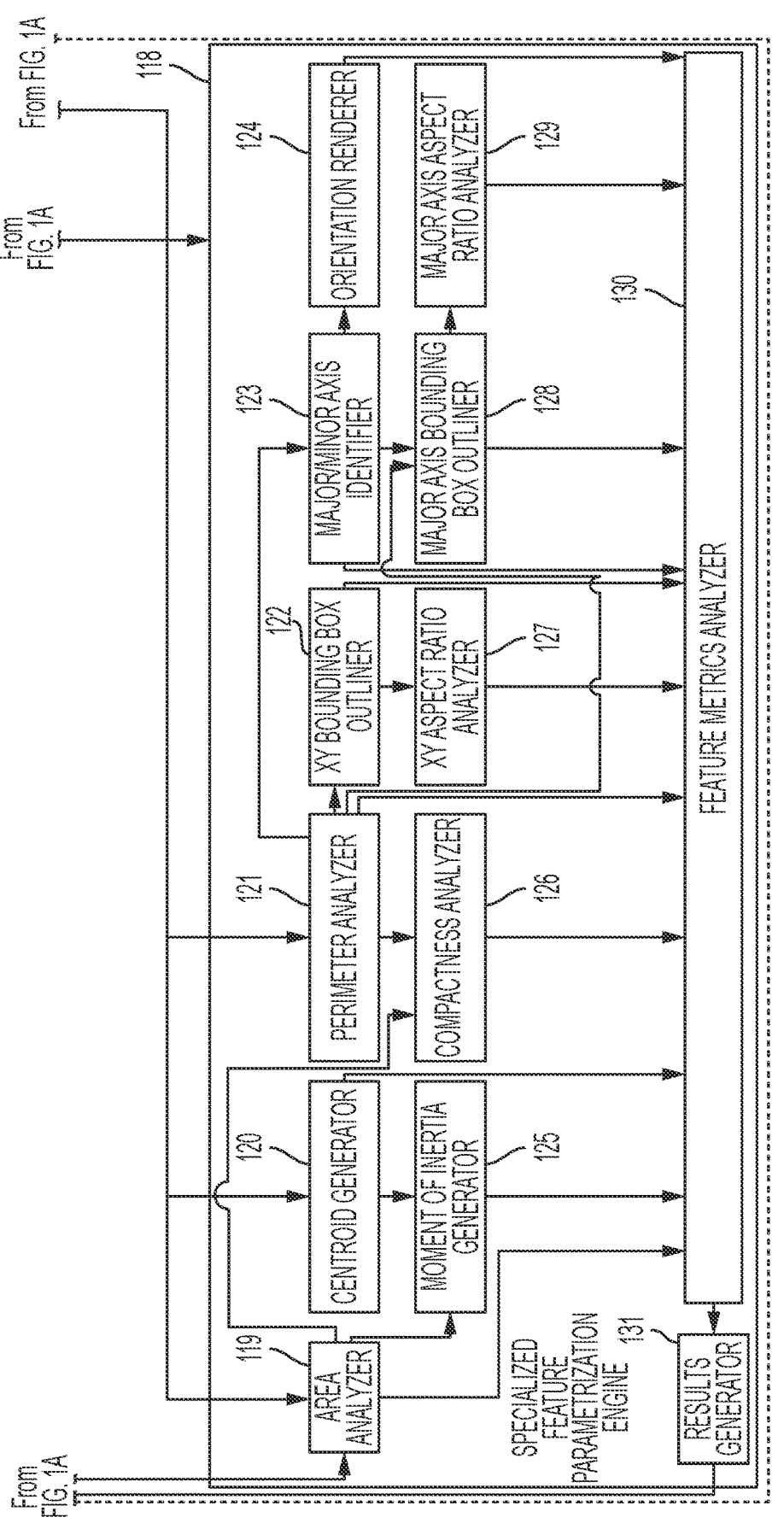

According to one embodiment of the invention illustrated in FIGS. 1A-1B, the present invention is implemented generally, using a system 100 which includes an image acquisition device (i.e., camera 101), and which interfaces with at least one information system including a computer system 102 connected to a display 103. In one embodiment, the computer system 102 includes a number of specialized engines or modules, or sub-components (described further below), which are unique to the present invention, to perform the functions of parameterization of spherical surfaces based on a 2-D image.

In one embodiment, an input device 104 or other selection device, may be provided and displayed in a user interface using a menu, a dialog box, etc. The user interface may be displayed on the display 103. According to one embodiment of the invention, users may input commands to a user interface through at least one of a number of input devices, including a keyboard, mouse, speech processing device, touch screen, etc.

In one embodiment of the invention, the (client) computer system 100 may include at least one processor 102, such as a central processing unit (CPU), a parallel processor, an input/output (I/O) interface, a memory 139 (database(s)) with a program having a data structure, and/or other components. According to one embodiment of the invention, the system 101 may have one or more data storage devices.

According to one embodiment of the invention, the image display device 103 may be a high-resolution touch screen computer monitor to clearly and accurately, display images.

According to one embodiment, the invention may be implemented by an application that resides on the computer system 100. Users may interact with the application through a specialized graphical user interface (GUI) 140 that is unique to the present invention. The application may be ported to other computer systems, including personal computers, cell phones, and/or any other digital device that includes a graphical user interface (GUI) and appropriate storage capability.

According to one embodiment of the invention, the at least one processor 102 may be internal or external to the computer system. According to one embodiment of the invention, the processor 102 may execute a program that is configured to perform predetermined operations. According to one embodiment of the invention, the processor 102 may access the memory/data storage 139 in which may be stored at least one sequence of code instructions that may include the program and the data structure for performing predetermined operations. The memory and the program may be located within the computer system 102 or external thereto. While the system 100 of the present invention may be described as performing certain functions, one of ordinary skill in the art will readily understand that the program may perform the function rather than the entity of the system itself.

According to one embodiment of the invention, the program that runs the system 100 may include separate programs having code that performs desired operations. According to one embodiment of the invention, the program that runs the system 100 may include a plurality of specialized modules or engines (i.e., feature segmentation engine 110, grid overlay and enumeration engine 114, configuration engine 135, grid generation engine 132, feature parameterization engine 118) that perform sub-operations of an operation or may be part of a single module of a larger program that provides the operation. According to one embodiment of the invention, the at least one processor 102 may be adapted to access and/or execute a plurality of programs that correspond to a plurality of operations. Operations rendered by the program may include, for example, supporting the user interface, providing communication capabilities, performing graphics functions, and/or performing other operations.

According to one embodiment of the invention, the storage device 139 may store at least one data file, such as image files, text files, data files, video files, among other file types. According to one embodiment of the invention, the data storage device 139 may include a database, such as a centralized database and/or a distributed database that are connected via a network. According to one embodiment of the invention, the databases may be computer searchable databases. According to one embodiment of the invention, the databases may be relational databases. The data storage device 139 may be coupled to a server and/or the client computer, either directly or indirectly through a communication network(s). The data storage device 139 may be an internal storage device and/or an external storage device. According to one embodiment of the invention, data may be received via a network and directly processed.

According to one embodiment of the invention, the computer system 100 may be coupled to other client computers or servers. According to one embodiment of the invention, the computer system 100 may access other systems via a communication link which may include a wired and/or wireless communication link or may include a network of data processing devices. According to one embodiment of the invention, the communication link may be implemented using a specialized piece of hardware or may be implemented using a general CPU that executes instructions from the program. According to one embodiment of the invention, the communication link may be at least partially included in the processor that executes instructions from the program.

According to one embodiment of the invention, if the server is provided, it may include a processor having a CPU or parallel processor, which may be a server data processing device and an I/O interface. The server processor may have access to a storage device for storing preferably large numbers of programs for providing various operations to the users.

According to one embodiment of the invention, the server may include a single unit or may include a distributed system having a plurality of servers or data processing units. The server(s) may be shared by multiple users in direct or indirect connection to each other. The server(s) may be coupled to a communication link that is preferably adapted to communicate with a plurality of client computers.

According to one embodiment, the present invention may be implemented using software applications that reside in a client and/or server environment. According to another embodiment, the present invention may be implemented using software applications that reside in a distributed system over a computerized network and across a number of client computer systems. Thus, in the present invention, a particular operation may be performed either at the client computer, the server, or both.

According to one embodiment of the invention, in a client-server environment, at least one client and at least one server are each coupled to a network, such as a local area network (LAN), or the Internet, over a communication link. According to one embodiment of the invention, users may access the various information sources through secure and/or non-secure internet connectivity. The server, if used, may be accessible by the client computer over the Internet, for example, using a browser application or other interface.

According to another embodiment of the invention, the client computer may be a basic system and the server may include all of the components that are necessary to support the software platform. Further, the present client-server system may be arranged such that the client computer may operate independently of the server, but the server may be optionally connected. In the former situation, additional modules may be connected to the client computer. In another embodiment consistent with the present invention, the client computer and server may be disposed in one system, rather being separated into two systems. Although the above physical architecture has been described as client-side or server-side components, one of ordinary skill in the art will appreciate that the components of the physical architecture may be located in either client or server, or in a distributed environment.

Further, although the above-described features and processing operations may be realized by dedicated hardware or may be realized as programs having code instructions that are executed on data processing units, it is further possible that parts of the above sequence of operations may be carried out in hardware, whereas other of the above processing operations may be carried out using software.

The underlying technology allows for replication to various other sites. Each new site may maintain communication with its neighbors so that in the event of a catastrophic failure, one or more servers may continue to keep the applications running, and allow the system to load-balance the application geographically as required.

Further, although aspects of one implementation of the invention are described as being stored in memory 139, one of ordinary skill in the art will appreciate that all or part of the invention may be stored on or read from other computer-readable media, such as secondary storage devices, like hard disks, external drives, CD-ROM, or other forms of ROM or RAM either currently known or later developed. Further, although specific components of the system have been described, one skilled in the art will appreciate that the system suitable for use with the methods and systems of the present invention may contain additional or different components.

Turning to the specifics of the present invention, in one embodiment, the system 100 for the parameterization of spherical surfaces is conducted as follow.

In one embodiment, the image acquisition device (i.e., camera) 101 (see FIGS. 1A and 1B and FIGS. 2A-2B (flow charts with method steps)) takes an image of a spherical object 105 with features of interest. In one embodiment, the image acquisition device 101 includes a feature acquisition engine 107, which includes a (remote) sensor 106 that utilizes at least one of infrared, ultraviolet, LIDAR, or visible spectrum, etc., to take the image of the spherical object 105. The sensor 106 is located on a sensor platform 108 including at least one of an orbiting or geosynchronous satellite, space probe, space-based or ground-based telescope.

In one embodiment, the normally, two-dimensional (2-D) image is transmitted from the remote sensor platform 108 where it was received (step 201, FIG. 2A) to a computer platform that saves the 2-D image in an image/video file storage device 109 (e.g., cloud storage such as Google® Cloud) (step 202). The storage device 109 may be provided at the remote sensor platform 108 or another (external) computer system (including computer system 102).

In one embodiment, computer system 100 includes a number of unique, specialized engines or modules (i.e., feature segmentation engine 110, grid overlay and enumeration engine 114, configuration engine 135, grid generation engine 132, feature parameterization engine 118), which include dedicated components, sub-components, and technology designed by the inventors, in order to perform the novel parameterization of spherical features from a 2-D image of the present invention. At every process performed by the processor 102 or its sub-components, or steps conducted by the program (steps 200-223), the data determined, obtained or retrieved is saved in data storage device 139.

Overall, taken in an ordered combination, the program of the present invention performs novel specialized operations by implementing feature segmentation of the 2-D image (feature segmentation engine 110), performing grid overlap and cell enumeration on the digitized image (grid overlap and enumeration engine 114) which utilizes grid generation data (grid generation engine 132) configured by a user (configuration engine 135), to determine the spherical feature metrics (feature parameterization engine 118), which are provided on a computer display 103 for the user.

More specifically, the 2-D image is accessed from the data storage device 109 by a specialized feature segmentation engine 110, which carries out image digitization using an image digitizer 111 (step 203), to convert the 2-D image to a format suitable for neural network (artificial intelligence (AI)) input (e.g., 0-255 values on RGB channels for each image pixel) using a convolutional neural network image processor 112.

In one embodiment, the convolutional neural network image processor 112 processes the 2-D image (step 204) based on a pre-trained deep learning model (AI) to detect the feature of interest from the image of the sphere. In one embodiment, a feature mask generator 113 of the feature segmentation engine 110 conducts a sequential process of binary (yes/no) indication of where the feature resides in the image, pixel by pixel (step 205).

In one embodiment, the resulting data from the feature mask generator 113 is sent by the specialized feature segmentation engine 110 to the specialized grid overlap and enumeration engine 114, which performs a comparison of overlaid grid cells to the feature(s) and tabulation of percentage coverage, cell by cell.

In one embodiment, the specialized grid overlap and enumeration engine 114 performs this comparison utilizing a grid alignment analyzer 115 which determines the position of the defined grid relative to the feature(s) of interest and overlays the grid onto the image and feature mask determined by the feature mask generator 113.

However, this comparison is a complex analysis performed by the grid overlay and enumeration engine 114 since the grid alignment analyzer 115 receives inputs, not only from the feature mask generator 113, but also from a specialized grid generation engine 132, which itself configures the grid in accordance with a user's preferences, which are compiled using a specialized configuration engine 135. This unique sequence or ordered combination, can only be automated and not performed manually, and is described as follows.

In one embodiment, with respect to the computer system 100 available to the user, a specialized configuration engine 135 collects user specification of configuration options and determines an appropriate method for grid generation that will be used by the specialized grid generation engine 132 (step 200), and for grid alignment by the specialized grid overlay and enumeration engine 114.

In one embodiment, the specialized configuration engine 135 includes a GUI dashboard 136 that permits the specification by the user (via GUI 140) of the feature parameters (i.e., radius of sphere, altitude, longitude, latitude (as any decimal from 90° to −90°) of the feature, granularity of the grid, desired cell area, and grid alignment options), which are inputted into the specialized configuration engine 135 via input device 104. Thus, a user(s) may select the recommendation that best suits their needs.

In one embodiment, this feature parameter data from the GUI dashboard 136 is provided by the program to the parameter analyzer 137 of the specialized configuration engine 135, which analyzes the selected set of configuration options by the user, and provides the data to a regime selector 138, which selects the precise unique methodology and generates the uniquely appropriate grid.

In one embodiment, the program provides the grid information from the regime selector 138 to the specialized grid generation engine 132, where it is inputted to an area/cell analyzer 133. In one embodiment, the area/cell analyzer 133 determines the equal-area per cell for the generated grid, and the definition of cell boundaries in terms of latitude and longitude (based on inputted user configuration) (step 200).

In one embodiment, the area/cell analyzer 133 provides the equal-area per cell data for the generated grid, to the longitude/latitude boundaries generator 134, which determines the precise longitude and latitude values for each row and columns of cells in the grid (step 200).

In one embodiment, the program determines the pairs of longitude/latitude divisions according to prioritization objectives, including: providing an even number of latitude divisions to span the hemisphere and include the equator; providing an integer number of longitude divisions to neatly divide the visible hemisphere West to East; providing a number of longitude divisions to result in single decimal longitude widths (e.g., 0.7°, 1.2°, 3.8°); providing a particular combination of longitude to latitude divisions to position square cells to the feature's latitude; and providing a fractional number of divisions to yield very square cells or a precise area per cell.

Generally speaking, the smaller the grid cell size, the more closely cells can approximate the uneven contours of a surface feature. This is especially true when the cells are counted in a binary manner, as containing the feature or not. In one embodiment, the cell size is kept fairly large by estimating the coverage percentage of cells that are partially covered by a feature's perimeter, which is used to calculate feature area.

In one embodiment, the present invention produces a grid of cells with the following advantageous properties:

1. Uncomplicated construction—in one embodiment, the present invention utilizes straightforward methodology to construct a grid without complicated formulae.

2. Cartesian—in one embodiment, the present invention creates a grid of cells which is rectangular and easily adapted to matrix computations.

3. Simple Cell indexing—in one embodiment, the cells do not require a complicated numbering scheme. This reduces the complexity of heuristic analyses such as nearest-neighbor search.

4. Longitude/latitude basis—in one embodiment, cell boundaries are based entirely on longitude (right ascension) and latitude (declination), which are the coordinate systems commonly used in astronomy and geodesy.

5. Iso-longitudinal and iso-latitudinal—in one embodiment, once the longitude and latitude lines are defined, they are the same for all rows and columns of cells. Cell location values do not need to be computed on-the-fly or taken from a look-up table.

6. Single method—the methodology of the present invention is consistent across all points on the sphere, vs. for example, shifting methods between polar and equatorial regimes.

7. Equal-area cells—in one embodiment, all cells are constructed to have exactly the same area, not approximately equal areas.

8. Variable grid resolution—the flexible construction of the present invention allows easy rescaling in either the horizontal or vertical dimension (or both) to achieve varying cell granularity. This helps manage the tradeoff between model complexity and the desired level of measurement precision. Alternative methods that only allow successive doubling or halving of resolution are not considered flexible.

9. Square cells at any latitude—in one embodiment, by adjusting the number of divisions of longitude and latitude, a ring of square cells can be created at any latitude. Square cells at the latitude of interest can be useful to preserve shapes and better measure distances of unknown direction. Square cells can also provide denser granularity for analyses related to area.

In one embodiment, once the longitude/latitude boundaries generator 134 of the grid generation engine 132 determines the precise longitude and latitude values for each row and column of cells in the grid (step 200), that grid information is provided by the program to the grid alignment analyzer 115 (step 206).

As noted above, in one embodiment, the grid alignment analyzer 115 determines the position of the defined grid relative to the feature(s) of interest and overlays the grid onto the image and feature mask determined by the feature mask generator 113 from the specialized feature segmentation engine 110 (step 207). The program then forwards this data to the overlap assessor 116.

In one embodiment, the overlap assessor 116 examines each cell to assess how much of the cell interacts with the feature mask (step 208), and the cell coverage analyzer 117 records the cell overlaps in a format to drive the analysis and algorithms of the specialized feature parameterization engine 118 (step 209). The specialized feature parameterization engine 118 performs analysis of the covered cells to calculate key feature metrics.

Accordingly, the data on cell overlaps from the cell coverage analyzer 117 is forwarded by the program to an area analyzer 119 of the specialized feature parameterization engine 118. In a complex determination, the area analyzer 119 also receives inputs from the area/cell analyzer 133 of the specialized grid generation engine 132, such that the area analyzer 119 of the specialized feature parameterization engine 118 can perform a determination of the total area of the feature (step 210).

More particularly, in one embodiment, when a grid of cells having equal surface area is overlaid onto the 2-D image of the sphere (step 207), then any observed feature could be compared to the grid (step 208), the number of intersected grid cells and the sum of the equal-area cells (step 209) would be determined to ascertain the overall area of the feature (step 210). Other measures related to the dispersion of the feature area such as centroid, moments of inertia and perimeter could also be determined by the program (steps 211, 212, 213), as discussed below. With the perimeter of the feature defined, the feature's major axis, orientation, bounding box, and aspect ratio can also be determined (steps 216, 219, 215, 218, 220), as discussed further below.

In one embodiment, in this complex, ordered sequence, the cell overlap data from the cell coverage analyzer 117 is also simultaneously provided to a number of other sub-components, in addition to area analyzer 119, of the specialized feature parameterization engine 118, including: a centroid generator 120, and a perimeter analyzer 121.

Thus, in one embodiment, with the data obtained from the cell coverage analyzer 117 of the specialized grid overlap and enumeration engine 114, and the area/cell analyzer 133 of the specialized grid generation engine 132, the area analyzer 119 determines the total area of the feature (step 210). This data is saved in data storage 139 and provided to the feature metrics analyzer 130 (discussed below).

In one embodiment, the area analyzer 119 measures area, which is the zeroth-order spatial moment of the feature (step 210). Given the data of covered cell percentages from the cell coverage analyzer 117, and the data from the area/cell analyzer 133, the area analyzer 119 utilizes the data on percentages and area-per-cell to find the overall feature area of the spherical object 105 (step 210). The area analyzer 119 also determines the area per cell from the total surface area of the sphere 105 and the number of cells in the grid.

In particular, the present invention utilizes square grid cells positioned to the latitude of the feature for more accuracy. This is also useful for further analysis by the centroid generator 120 and moment of inertia generator 125, as well as the area analyzer 119, which assume the center of the cell is the center of its mass is true when the cells are square. Also, the other processors such as the perimeter analyzer 121, compactness analyzer 126, bounding box outliner 122, major bounding box outliner 128, and major axis identifier 123, are programmed to assume square cell dimensions. Although the grid cells, having been defined by non-parallel longitude lines, are never exactly square, the cell area can be determined precisely by the program of the present invention using the total surface area of the visible hemisphere and the longitude and latitude divisions.

Thus, in one embodiment, the data from the cell overage analyzer 117 is analyzed by the centroid generator 120, which determines the first-order spatial moment of the feature center of mass (step 211), normalized by the area determined by the area analyzer 125 when that data is provided to the moment of inertia generator 125 (step 212). This is the center of mass, or centroid of the feature. Because the generated grid of cells partitions the sphere's surface neatly into contiguous quadrilateral cells, the feature center of mass (centroid) is determined by the centroid generator 120 in terms of longitude and latitude.

More particularly, in the present invention, the feature's percentage coverage of each cell can be thought of as a weighted vote for the latitude and longitude coordinate at the cell's center. The program sums the latitude and longitude voting separately and then divides by the total cell coverage yields the average weighted longitude and latitude, to define the centroid of the feature's area (step 211).

The present invention accommodates features with irregular perimeters, and even multiple features whose overall centroid needs to be determined. Further, if the feature contains holes or even varying densities, the unique processes of the present invention will continue to allow determination of a center of mass, which would not be able to be determined accurately otherwise. In one embodiment, the data from the centroid generator is stored by the program in database 139 (as is all data generated by the other processes) and provided to the moment of inertia generator 125.

In one embodiment, the moment of inertia generator 125 also utilizes the data on cell coverage and area from the area analyzer 119 to generate moments of inertia along the X and Y axes (step 212). In one embodiment, the moment of inertia generator 125 measures the second-order spatial moment of the feature, normalized by the centroid determined by the centroid generator 120 (step 212). This is the "area moment of inertia" and the program has the novel capability of describing how the area of the feature is dispersed about the centroid in the X and Y directions in an efficient manner.

Similar to the functions of the centroid generator 120, the moment of inertia generator 125 finds the second moments of area about an X-axis ($I_X$) and Y-axis ($I_Y$) that pass through the centroid. In one embodiment, the moment of inertia generator 125 assigns each cell center a row and column index representing the center of the cell and rewrites the centroid longitude and latitude in terms of the cell indices.

Figure 2A:
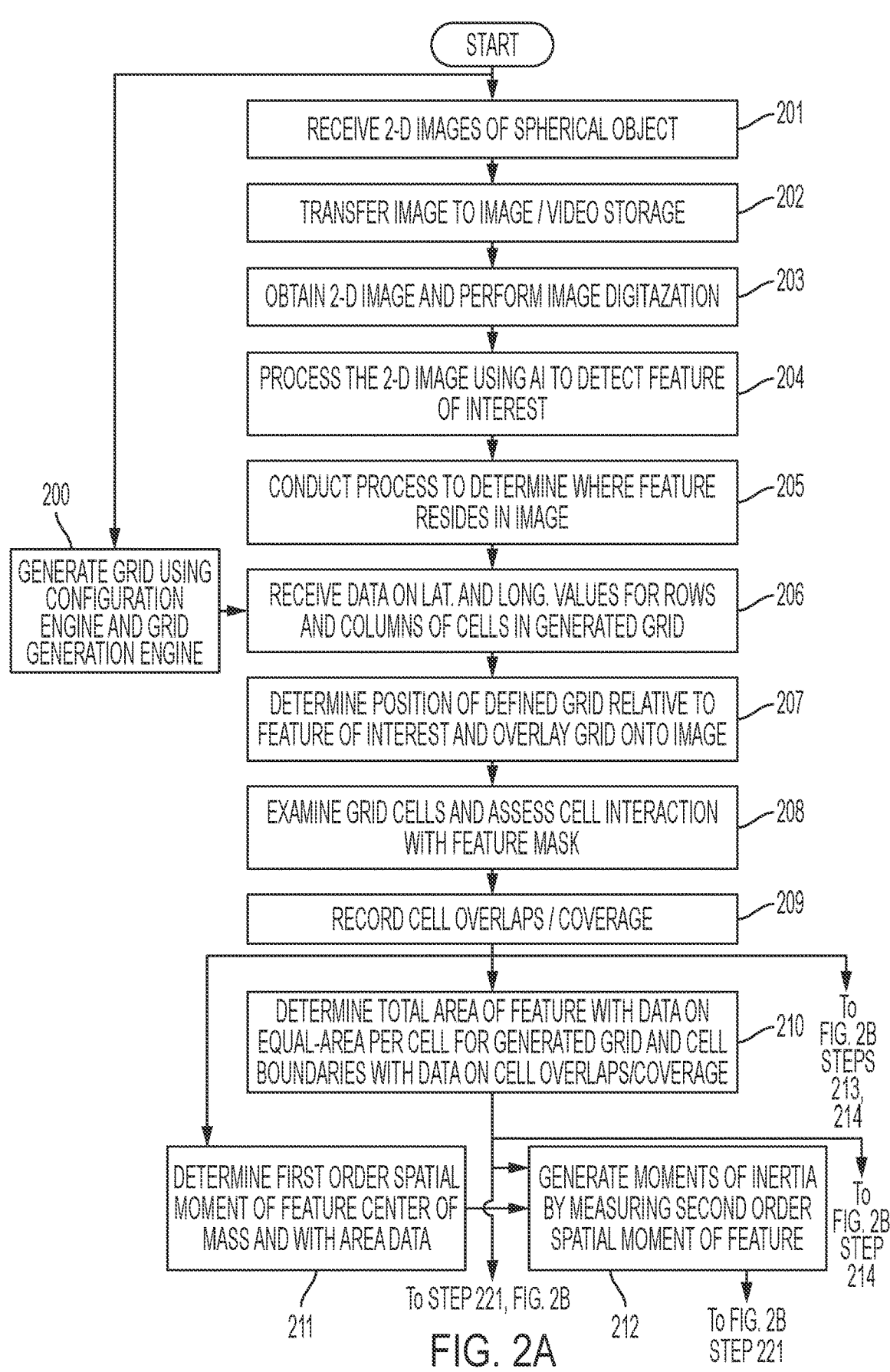
FIGS. 2A and 2B show a flow chart of the major steps in determining the parameterization of features on spherical surfaces based on a 2-D image, according to one embodiment consistent with the present invention.
Figure 2B:
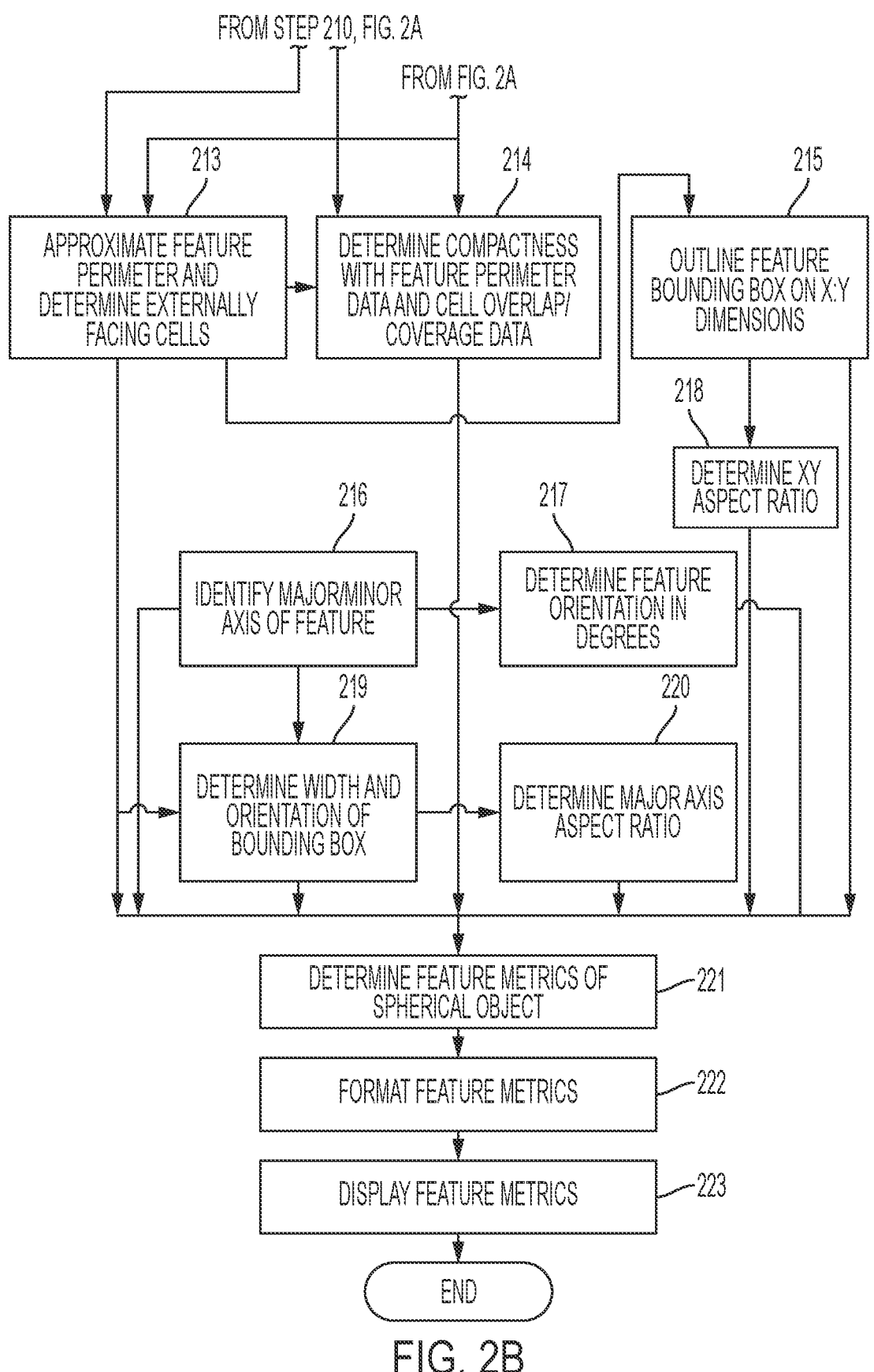

In one embodiment, the data from the cell coverage analyzer 117 is also forwarded by the program to the perimeter analyzer 121, to approximate the feature perimeter (FIG. 2B, step 213). In one embodiment, given the information from the cell coverage analyzer 117, the perimeter of the feature can be isolated and the externally facing sides of the perimeter cells can be determined by the perimeter analyzer 121 (step 213). Taking the diameter of the cells as the unchanging square root of the cell areas, the perimeter analyzer 121 utilizes the diameter by the external cell side count to determine the perimeter distance. Since vertical and horizontal cell sides are assumed to have equal distance, this determination includes the program first positioning the square cells to the latitude of the feature being analyzed.

In one embodiment, the detected perimeter is formed by a continuous boundary of cells that connect at either their faces or their corners. This is an eight-connected boundary. Where boundary cells connect at their faces, the perimeter distance will be the diameter of the cells. Where boundary cells connect at their corners, the perimeter distance may be calculated as the Euclidean distance of SQRT(2) cell diameters, for a more accurate estimate which improves with increasing cell resolution. The perimeter analyzer 121 carries out a novel ordered sequence to accomplish this task (step 213) —all while the program is simultaneously performing other unique, complex functions at the area analyzer 119, centroid generator 120, XY bounding box outliner 122, major/minor axis identifier 123, orientation renderer 124, and major axis aspect ratio analyzer (steps 211-220) (discussed further below).

In one embodiment, the first step carried out by the perimeter analyzer 121 (step 213) of the present invention is to create a binary mask of the feature that codes a "0" for presence of the feature in a cell and "1" for cells where the feature is not present. A threshold may be considered for presence by the program, such as requiring more than 25% occupancy of the cell.

In one embodiment, in a second step, the perimeter analyzer 121 fills in any single interior cells that are not showing the feature's presence. This is done by the program changing any 1 to 0 when the cell is surrounded on four sides by cells that contain a 0. In other words, to fill in any one-cell holes. Only the perimeter at the external edge of the feature, and not the internal edges from the holes are utilized.

In one embodiment, in a third step, the program searches and locates perimeter cells that are connected diagonally and the perimeter analyzer 121 modifies the nearest exterior cell to contain a value less than one. A value of SQRT(2)/2 is recommended, such that when the two sides of the diagonally-connected cells are summed, their value will equal the Euclidean diagonal of SQRT(2).

In one embodiment, in a fourth step, the program counts each externally facing cell on the perimeter, including the discounted Euclidean value for diagonals (step 213). The cell-side total multiplied by the cell diameter yields the perimeter distance of the feature. The feature perimeter data (step 213) is saved in database 139 of the feature metrics analyzer 130 (step 221) by the program, which also forwards the data to a compactness analyzer 126 and the major axis bounding box outliner 126.

In one embodiment, the program provides the feature perimeter data to the compactness analyzer 126, which also uses the cell coverage and area calculation from the area analyzer 119 to determine compactness (step 214). As determined by the program, the "compactness" of a feature is a measure of how well its perimeter is minimized to contain maximum area. For example, the most compact object then is a circle, and the measurement is normalized to a maximum value of 1 for a circle. "Compactness" is defined as the ratio of the area of the feature to the area of a circle having the same perimeter.

Thus, given a feature of perimeter P, the compactness analyzer 126 determines the area of a circle with the same perimeter, using area data from the area analyzer 119, and the perimeter data from the perimeter analyzer 121 (step 214), and provides this data to the feature metrics analyzer 130.

In simultaneous manner, in one embodiment, the data from the perimeter analyzer 121 is forwarded to the XY bounding box outliner 122, which outlines a feature bounding box on the X and Y dimensions (step 215). The "X-Y bounding box" is the smallest longitude- and latitude-aligned rectangle that completely encloses a feature. The bounding box is defined by the range of its longitude and latitude, as well as by the distance of its sides. The ratio of the bounding boxes horizontal width to its vertical height is the X:Y aspect ratio of the feature.

In one embodiment, the XY bounding box outliner 122 is utilized to find the corners of the bounding box (step 215), which encompasses the program finding the maximum and minimum values within the recorded longitude and latitude range of the perimeter cells. In one embodiment, the width and height of the bounding box are determined by the XY bounding box outliner 122 from the cell count width and height of the perimeter. Taking the constant diameter of the cells as the square root of the area, the width and height is obtained from multiplying that by the cell counts. In one embodiment, the data from the XY bounding box outliner 122 is provided to the feature metrics analyzer 130 by the program and to data storage 139.

In one embodiment, the XY aspect ratio (width to height) of the bounding box is determined by the XY aspect ratio analyzer 127 (step 218) and is the ratio of width and height cell counts from the XY bounding box outliner 122. This data is provided to data storage 139 and to feature metrics analyzer 130.

In one embodiment, simultaneously with the above operations, the data from the perimeter analyzer 121 is analyzed by the major/minor identifier 123 (step 216), which identifies the longest chord through the feature, and then the longest chord perpendicular to that identified longest chord.

More specifically, a common technique for describing the orientation of stretched features (i.e., not square or circular, but with a discernable orientation) is to identify the "major axis" of the feature. The "major axis" is the longest line segment that connects two points on the feature's perimeter. The "minor axis" is then the longest line segment perpendicular to the major axis that connects two perimeter cells.

In one embodiment, the perimeter cells of the feature have already been determined by the perimeter analyzer 121 and provided to the feature metrics analyzer 130 by the program (step 213). For convenience, the row and column indices are used by the program to identify the perimeter cells, as was done for the moments of inertia determinations by the moment of inertia generator 123 (step 212).

In the present invention, the coordinate system utilized defines the orientation of the feature as the slope of the major axis. Assuming the cells are square, the two perimeter cells at greatest distance are determined by the major/minor axis identifier 123 (step 216) by arraying all n(n−1)/2 combinations of n perimeter cells and taking the Euclidean distance of their cell indices. For nine perimeter cells, for example, there are 9(9−1)/2=36 unique pairs.

Accordingly, in one embodiment, the major axis is determined by the major/minor axis identifier 123 between the centers of the most distant cells, and not their outer edges (step 216). This is because the perimeter cells might only be partially covered by the feature. If greater accuracy is needed, or if more than one pair of cells shares the greatest distance, then more longitude/latitude divisions can be made by the program to increase the cell count resolution. The slope of the major axis is the difference of the cell pair y values divided by the difference of their x values.

In one embodiment, the chords identified by the major/minor identifier 123 (step 216) are provided to the major axis bounding box outliner 128, along with the perimeter feature data from the perimeter analyzer 121, to outline the major axis bounding box (step 219), and also to an orientation renderer 124 which uses the major axis to determine the feature orientation in degrees (step 217). The data from the orientation renderer 124 which uses the major axis to determine the feature orientation in degrees (step 217), is also provided directly to the feature metrics analyzer 130. The data from the major/minor axis identifier 123 is also provided by the program directly to the feature metrics analyzer 130 and data storage 139.

Thus, in one embodiment, the major axis bounding box outliner 128 of the present invention determines the width of the bounding box and its orientation and finds the bounding box of smallest dimension that completely encloses the feature (step 219). In one embodiment, the top and bottom of the bounding box are set by the two-line segments that extend perpendicularly above and below the major axis and have the greatest distance from the major axis to the perimeter. The major axis bounding box outliner then provides that data to the major aspect ratio analyzer 129 to take the width/height ratio of that bounding box as the most accurate measure of the feature's aspect ratio (step 220). In one embodiment, the data from the major axis aspect ratio analyzer 129 is provided to the feature metrics analyzer 130 and data storage 139.

Thus, in one embodiment, the major axis aspect ratio analyzer 129 determines the aspect ratio utilizing data from the major axis bounding box outliner 128 (step 220). A related measurement is elongation which is defined as the shortest dimension divided by the longest dimension. Elongation has a maximum value of 1 when the feature is circular or square. In one embodiment, the major axis aspect ratio analyzer 129 also determines the elongation, which is the inverse of the aspect ratio.

In one embodiment, the data from these sub-components of the specialized feature parameterization engine 118, such as the centroid generator 120, the perimeter analyzer 121, the XY bounding box outliner 122, the major/minor axis identifier 123, and the orientation renderer 124, are all stored in data storage 139, in addition to data obtained directly from the moment of inertia generator 125, compactness analyzer 126, XY aspect ratio analyzer 127, major axis bounding box outliner 128 and major axis aspect ratio analyzer 129. In one embodiment, the feature metrics analyzer 130 of the specialized feature parameterization engine 118 collects all this complex data and determines feature metrics (step 221) and organizes them for storage in a database (data storage 139) (step 221), and for reporting to the user.

In one embodiment, the feature metrics analyzer 130 determines the specifications of the feature on the spherical object 105, including feature area, feature centroid, moments of inertia, feature perimeter, major axis, compactness, orientation, bounding boxes, and aspect ratios (step 221).

Thus, in one embodiment, the data provided to the results generator 131 from the feature metrics analyzer 130 (step 221), is formatted for display (step 222), and provided to the display 103 in a visualization dashboard (step 223) using GUI 140. The feature metrics are saved in storage 139 and can be retrieved for view at a later time from the storage database 139 by the program.

Thus, with the wide array of properties of area, centroid, moments of inertia, perimeter and compactness, major axis and orientation, bounding boxes and aspect ratios, the present invention may be deployed to measure the characteristics of surface features of a spherical object in an accurate and automated way which is impossible to achieve manually.

Exemplary Embodiment: Titan

The present invention was demonstrated with the real use case of characterizing methane clouds in the atmosphere of Titan from images taken by the Cassini space probe.

Saturn's moon Titan is the only other body in the solar system that has liquid lakes, rivers and clouds and an evaporation/precipitation cycle like Earth's. On Titan, the liquid and vapor are methane, but the cycle is entirely analogous to Earth's water cycle. Studying the seasonal and long-term weather patterns of Titan's methane clouds will permit understanding of atmospheric mechanisms on Earth and on other solar system worlds.

Whereas previous analysis of Titan's methane clouds has relied upon difficult, lengthy, manual detection and individual human characterization, creating a way to order, automate, and make efficient this complex analysis using machine learning and artificial intelligence (AI) to detect methane clouds in images of Titan's atmosphere, was highly desired and fulfilled by the present invention. Further, the benefits of increasing the efficiency of the computer system process were highly desired and achieved by the present, novel processes.

In an exemplary embodiment, the following provides a detailed example of the specialized engines and components of the present invention in use, to characterize the surface features of a spherical objects. With respect to the sphere, in one embodiment, the parameters of the grid were specified by a user via inputs to the specialized configuration engine 135 (step 200). To start, the user utilizes the GUI dashboard 136 and inputted a spherical radius of 2615 km, based on the radius of Titan of approximately 2575 km and an average methane cloud altitude of 40 km. In the exemplary embodiment, the parameter analyzer 137 determined a spherical surface area of $4\pi r^2 = 85,931,670$ km$^2$.

In one embodiment, the user inputter preferences for a grid cell granularity of approximately 50,000 km$^2$ with exact alignment on the equator as well as exact alignment on the east/west hemispheres and north/south poles. In addition, a preference for square cells occurring at 50° North latitude, which was the approximate latitude of the feature of interest, was received by the specialized configuration engine 135. In the exemplary embodiment, the regime selector 138 recommended a cell layout of 90 rows by 20 columns producing a grid of 1,800 cells. This information determined by the specialized configuration engine (step 200) was forwarded to the grid generation engine 132 by the program.

In the exemplary embodiment, the operator requirements and recommended grid layout obtained by the configuration engine 135 were analyzed by the area/cell analyzer 133 which calculated an area of 954,796 km$^2$ per row and 47,740 km$^2$ per cell. Using the determined area per row of 954,796 km$^2$ and the grid layout of 20 columns, the longitude/latitude boundaries generator 134 calculated successive north latitude boundaries of 90.00000°, 77.89851°, 72.85379°, 68.96053°, etc. and east longitude boundaries of 0°, 18°, 36°, 54°, etc.

In the exemplary embodiment, the normalized grid of desired longitude and latitude lines was produced by the program according to the process steps above regarding the specialized configuration engine 135 and the specialized grid generation engine 132 (step 200), and the program overlaid the grid onto the 2-D image of the moon (Titan) and its methane cloud (step 206), and the program determined the feature position relative to the grid using the grid alignment analyzer 115 and overlap assessor 116 (steps 207-208).

The percentage overlap of the cloud on each cell was determined by the overlap assessor 116 and by examining the grid cells (step 208), and the cell coverage was provided by the cell coverage analyzer 117 (step 209).

In the exemplary embodiment, the area of the feature was determined by the area analyzer 119, which area is the zero$^{th}$-order spatial moment of the feature (step 210). Given the covered cell percentages determined in step 209, the program summed those percentages and multiplied by the area/cell to find the overall feature area (step 210). The program determined the area/cell by dividing the total surface area of the sphere by the number of cells in the grid.

In the exemplary embodiment, the grid used was of 90 rows by 20 columns, producing 1800 cells, each of constant area=47,740 km$^2$. In the exemplary embodiment, the feature covered 11.70 cells and therefore, the program determined it has an area of 558,556 km$^2$ which is 0.65% of the total surface area.

Next, in the exemplary embodiment, the first-order spatial moment of the feature, normalized by the area determined in step 210, was performed (step 211). This is the center of mass, or centroid of the feature. Since the sphere is divided into contiguous quadrilateral cells, the program provided the rows and columns structure and the centroid generator 120 determined the centroid in terms of longitude and latitude (step 211).

In the exemplary embodiment, by summing the latitude and longitude voting separately and then dividing by the total cell coverage, the average weighted longitude and latitude was determined by the program, which defined the centroid of the feature's area (step 211).

In the exemplary embodiment, the centroid analyzer 120 determined the centroid of the cloud feature was located at 51.05° North Latitude and 93.18° East Longitude.

In the exemplary embodiment, with the cloud feature characterized, a visualization of the feature on equal-area cells, including the feature's perimeter, were visualized by the feature metrics analyzer 130 and results generator 131, and displayed on display 103 (steps 221-223). In this manner, the perimeter analyzer 121 isolated the perimeter and counted the externally-facing sides of the perimeter cells to obtain a perimeter of 20.243 cells (step 213). The program assumed the diameter of the cells to be the unchanging square root of the cell area equal to 218.5 km and multiplied it by the external cell side count to determine the perimeter distance (step 213).

By performing the processes described above with respect to the perimeter analyzer 121, the program defined the perimeter as 4,423 km.

Next, in the exemplary embodiment, the program determined compactness of the feature (step 214) using the compactness analyzer 126, to measure how well the perimeter was minimized to contain maximum area, or the ratio of the area of the feature to the area of a circle having the same perimeter, P.

Using A=558,556 km$^2$ and P=8,027 km, the program determined the Compactness=$4\pi(558,556$ km$^2)/(4,423$ km$)^2$=0.359. The exemplary feature is thus, determined to be fairly elongated.

In the exemplary embodiment, the program determined the major axis of the feature by the major/minor axis identifier 123 (step 216). In this exemplary embodiment, the program determined the two perimeter cells at greatest distance, by arraying all $n(n-1)/2$ combinations of cells and comparing the Euclidean distance of their cell indices.

For the seventeen perimeter cells of this exemplary embodiment, there were $17(17-1)/2=136$ unique pairs. The pair of cells with X,Y indices (0,4) and (7,2) were separated by the greatest Euclidean distance of SQRT$[(0-7)^2+(4-2)^2]=7.28$ cell diameters. Using a cell diameter of 218.5 km, the square root of the (assumed) square cell area, the program determined the length of the major axis was 1,591 km.

In the exemplary embodiment, the program determined the slope of the major axis as the difference of the cell pair y values divided by the difference of their x values=$(4-2)/(0-7)=-0.286$. The major axis fell on the line with equation y=−0.286)x+4.

In the exemplary embodiment, the data from the major/minor axis identifier 123 was provided to the orientation renderer 124, which determined the orientation of the feature, which is the arctangent of the slope=DEGREES(ATAN(−0.286))=−15.9° (step 217).

In the exemplary embodiment, the major axis bounding box outliner 128 found the bounding box of smallest dimension that completely enclosed the feature (step 219) and then took the width/height ratio of that bounding box as the most accurate measure of the feature's aspect ratio (step 220). The major axis sets the width of the gray bounding box and its orientation. The top and bottom of the bounding box are set by the two, line segments that extend perpendicularly above and below the major axis and have the greatest distance to the perimeter. The program determined the distance from that line to each of the perimeter cells to find maxima above and below the line.

When the program determined this distance for all seventeen perimeter cells of the example, cell (5,4) had the maximum distance of 1.374 cells above the major axis, and cell (2,3) had the greatest distance of 0.4112 cells below the major axis. The program determined the sum of their distances as 1.786 cells. The program converted those cell index distances to kilometers by multiplying by cell diameter of 218.5 km, resulting in a bounding box width of 1,591 km and height of 390 km (step 215).

The major axis aspect ratio analyzer 129 then determined the aspect ratio (step 220), which is the major axis width divided by the sum of the two perpendicular segment distances, or 4.077:1. The program also determined the elongation, which is the inverse of the aspect ratio, or 0.245.

In the exemplary embodiment, once the cell indices were obtained by the program, the longitude/latitude of the cell centers were used by the program to interpolate coordinate values. The resulting corners of the bounding box (step 219) were:

Top-Left: 54.94° N. Lat, 61.90° E. Long.
Top-Right: 50.72° N. Lat, 124.90° E. Long.
Bottom-Right: 47.38° N. Lat, 120.48° E. Long.
Bottom-Left: 51.29° N. Lat, 57.48° E. Long.

All the above metrics of the feature were saved in database 139 (step 220), analyzed and provided by the feature metrics analyzer 130 (step 221), and provided to the results generator 131 for formatting (step 222) and visualization on the display 103 (step 223).

As shown above by the exemplary embodiments, the complex elements of the present invention work together in an ordered combination to provide an automated feature analysis of a spherical surface, such as—in the case of planetary missions—a planet or a moon. These intricate measurements and characterizations are increasingly important to planetary science as the number of missions and imaging capability grows, and as computation is moved to the spacecraft itself, to summarize results before transmission across limited bandwidth channels back to Earth.

Accordingly, the present invention provides a novel approach for the grid-oriented parameterization of features on spherical surfaces. The methodology of the present invention is both iso-latitudinal and iso-longitudinal, creating a cartesian grid of equal-area cells with fixed longitude and latitude boundaries, which allows the performance of automated high-speed matrix computation in a quick and efficient manner.

The present invention has the advantages of being much easier to construct, has simpler cell indexing, flexibility of resolution and square cell positioning, integrates well with commonly used longitude/latitude and right ascension/declination coordinate systems, is iso-longitudinal and iso-latitudinal (i.e., uses constant grid cell boundaries), is single method (same methodology across all grid cells), has easily varied cell resolution and can position square cells anywhere on the sphere.

The tessellation of a sphere allows simplified measurement of features and provides commercial potential for satellites measuring features on planets and moons—i.e., crops, pollution, weather, ice, floods, fire, etc. The present invention equal-area grid can also be used to measure features on the celestial sphere, such as the cosmic microwave background and other forms of radiation, as well as enhancing astronomical observations.

It should be emphasized that the above-described embodiments of the invention are merely possible examples of implementations set forth for a clear understanding of the principles of the invention. Variations and modifications may be made to the above-described embodiments of the invention without departing from the spirit and principles of the invention. All such modifications and variations are intended to be included herein within the scope of the invention and protected by the following claims.

What is claimed is:

1. A system which determines a plurality of metrics of a feature on a spherical surface, the system being disposed at one of a client computer or a server, comprising:

a grid generation engine which generates a grid according to a user configuration;

a feature segmentation engine which digitizes a two-dimensional image of the spherical surface containing the feature and determines a location in said image where the feature resides, a grid overlay and enumeration engine which determines a position of said grid relative to the feature and overlays said grid onto said image to determine grid cell overlap and coverage; and a feature parameterization engine which performs analysis of said covered cells to obtain the plurality of metrics of the feature which are displayed to a user, wherein said feature parametrization engine further comprises:

a plurality of sub-components to which data on said grid cell coverage from said cell coverage analyzer is provided, including:

a centroid generator which utilizes data from said area analyzer and data from said cell coverage analyzer to determine a centroid as a first-order spatial moment of a center of mass of the feature in latitude and longitude;

a perimeter analyzer which utilizes data from said cell coverage analyzer and isolates perimeter cells of a perimeter of the feature and determines externally facing sides of said perimeter cells, to determine a perimeter;

an XY bounding box outliner which utilizes data from said perimeter analyzer to outline a bounding box on the X and Y dimensions of the feature;

a major/minor axis identifier which utilizes data from said perimeter analyzer to identify a major axis which includes a longest line segment that connects two points on said perimeter of the feature, and a minor axis which includes a longest line segment perpendicular to said major axis that connects two of said perimeter cells; and an orientation renderer which utilizes said data on said major axis from said major/minor axis identifier to determine a feature orientation in degrees.

2. The system of claim 1, the system further comprising:

a graphical user interface (GUI) accessed by a user;

a configuration engine which collects specification data from said user on grid configuration and selects said grid; and a grid generation engine which utilizes data from said configuration engine and determines equal-area per cell of said grid, and a definition of cell boundaries in latitude and longitude in said grid.

3. The system of claim 2, wherein said grid overlay and enumeration engine comprises:

a grid alignment analyzer which determines said position of said grid relative to the feature for each row and column of cells in the grid utilizing said cell boundaries in longitude and latitude from said grid generation engine, and overlays said grid onto said image;

an overlap assessor which examines each of said cells in said grid to assess how much each of said cells interacts with a feature mask which determines said location in said image where the feature resides; and a cell coverage analyzer which records said grid cell overlap or coverage in a format to implement said analysis and determination of said plurality of metrics of the feature by said specialized feature parameterization engine.

4. The system of claim 3, wherein said feature parameterization engine comprises:

an area analyzer which receives inputs from an area/cell analyzer of said grid generation engine, and receives inputs from said cell coverage analyzer on grid cell coverage, to determine said equal-area per cell of said grid, and a total area of the feature.

5. The system of claim 4, the system further comprising: a moment of inertia generator which measures a second-order spatial moment of the feature, normalized by said centroid determined by said centroid generator, to generate moments of inertia along the X and Y axes.

6. The system of claim 5, the system further comprising: a compactness analyzer which utilizes data on said total area from said area analyzer and data from said perimeter analyzer to determine compactness as a measure of a minimization of said perimeter to contain a maximum area.

7. The system of claim 6, the system further comprising: an XY aspect ratio analyzer which utilizes data from said XY bounding box outliner and determines a ratio of width to height of said bounding box.

8. The system of claim 7, the system further comprising: a major axis bounding box outliner which utilizes data from said perimeter analyzer and said major/minor axis identifier and determines a width and an orientation of said bounding box, and a height of said bounding box equal to the sum of two maximum perpendicular segments above and below a major axis.

9. The system of claim 8, the system further comprising: a major axis aspect ratio analyzer which determines an aspect ratio utilizing data from said major axis bounding box outliner, by dividing said width of said bounding box by said height of said bounding box obtained from said major axis bounding box outliner.

10. The system of claim 9, wherein said feature parameterization engine further comprises:

a feature metrics analyzer which receives data directly from said area analyzer, said moment of inertia generator, said compactness analyzer, said XY aspect ratio analyzer, said major axis bounding box outliner, and said major axis aspect ratio analyzer; and wherein said feature metrics analyzer receives data directly from said centroid generator, said perimeter analyzer, said XY bounding box outliner, said major/minor axis identifier, and said orientation renderer; and wherein said feature metrics analyzer analyzes all data from said area analyzer, said moment of inertia generator, said compactness analyzer, said XY aspect ratio analyzer, said major axis bounding box outliner, said major axis aspect ratio analyzer, said centroid generator, said perimeter analyzer, said XY bounding box outliner, said major/minor axis identifier, and said orientation renderer, to determine said plurality of metrics of the feature.

11. The system of claim 10, the system further comprising:

a data storage which stores all data from said feature parameterization engine including said feature metrics analyzer, and from said configuration engine, said grid generation engine, said feature segmentation engine, and said grid overlay and enumeration engine.

12. The system of claim 11, wherein said plurality of feature metrics includes at least said total area, said centroid, said moments of inertia, said perimeter, said major axis, said compactness, said orientation, said XY bounding box, said major axis bounding box, said XY aspect ratio and said major axis aspect ratio.

13. The system of claim 12, the system further comprising:

a display; and a results generator which formats said plurality of feature metrics from said feature metrics analyzer and displays them on said display for said user.

14. The system of claim 2, wherein said configuration engine comprises:

a GUI dashboard that receives and displays said specification data from said user utilizing said GUI, said specification data which includes feature parameters and grid requirements;

a parameter analyzer which analyzes said specification data by said user to determine said grid configuration; and a regime selector which generates said grid based on said grid configuration.

15. The system of claim 14, wherein said grid generation engine comprises:

an area/cell analyzer which determines said equal-area per cell for said grid, and defines cell boundaries in latitude and longitude; and a longitude/latitude boundaries generator which determines longitude and latitude for each row and columns of cells in said grid.

16. The system of claim 1, the system further comprising:

a feature acquisition engine including:

a sensor that takes said two-dimensional image of the spherical object;

a remote sensor platform on which said sensor is disposed; and a data storage device which stores said image.

17. The system of claim 1, wherein said covered cells are square.

18. A method of determining a plurality of metrics of a feature on a spherical surface, the method comprising:

generating a grid according to a user configuration utilizing a grid generation engine;

digitizing a two-dimensional image of the spherical surface containing the feature using a feature segmentation engine, and determining a location in said image where the feature resides, determining a position of the grid relative to the feature utilizing a grid overlay and enumeration engine, which determines and overlays the grid onto the image to determine grid cell overlap and coverage; and performing an analysis of the covered cells using a feature parameterization engine, to obtain the plurality of metrics of the feature which are displayed to a user;

wherein the plurality of metrics includes at least a total area, a centroid, moments of inertia, a perimeter, a major axis, a compactness, an orientation, an XY bounding box, a major axis bounding box, an XY aspect ratio and a major axis aspect ratio, of the feature, and wherein the feature parametrization engine further comprises:

a plurality of sub-components to which data on said grid cell coverage from said cell coverage analyzer is provided, including:

a centroid generator which utilizes data from said area analyzer and data from said cell coverage analyzer to determine a centroid as a first-order spatial moment of a center of mass of the feature in latitude and longitude;

a perimeter analyzer which utilizes data from said cell coverage analyzer and isolates perimeter cells of a perimeter of the feature and determines externally facing sides of said perimeter cells, to determine a perimeter;

an XY bounding box outliner which utilizes data from said perimeter analyzer to outline a bounding box on the X and Y dimensions of the feature;

a major/minor axis identifier which utilizes data from said perimeter analyzer to identify a major axis which includes a longest line segment that connects two points on said perimeter of the feature, and a minor axis which includes a longest line segment perpendicular to said major axis that connects two of said perimeter cells; and an orientation renderer which utilizes said data on said major axis from said major/minor axis identifier to determine a feature orientation in degrees.

19. A computer system which automatically determines a plurality of metrics of a feature on a spherical surface, the computer system comprising:

at least one memory having at least one program which comprises the steps of:

generating a grid according to a user configuration utilizing a grid generation engine;

digitizing a two-dimensional image of the spherical surface containing the feature using a feature segmentation engine, and determining a location in said image where the feature resides, determining a position of the grid relative to the feature utilizing a grid overlay and enumeration engine, which determines and overlays the grid onto the image to determine grid cell overlap and coverage; and performing an analysis of the covered cells using a feature parameterization engine, to obtain the plurality of metrics of the feature which are displayed to a user;

wherein the plurality of metrics includes at least a total area, a centroid, moments of inertia, a perimeter, a major axis, a compactness, an orientation, an XY bounding box, a major axis bounding box, an XY aspect ratio and a major axis aspect ratio, of the feature, and wherein said feature parametrization engine further comprises:

a plurality of sub-components to which data on said grid cell coverage from said cell coverage analyzer is provided, including:

a centroid generator which utilizes data from said area analyzer and data from said cell coverage analyzer to determine a centroid as a first-order spatial moment of a center of mass of the feature in latitude and longitude;

a perimeter analyzer which utilizes data from said cell coverage analyzer and isolates perimeter cells of a perimeter of the feature and determines externally facing sides of said perimeter cells, to determine a perimeter;

an XY bounding box outliner which utilizes data from said perimeter analyzer to outline a bounding box on the X and Y dimensions of the feature;

a major/minor axis identifier which utilizes data from said perimeter analyzer to identify a major axis which includes a longest line segment that connects two points on said perimeter of the feature, and a minor axis which includes a longest line segment perpendicular to said major axis that connects two of said perimeter cells; and an orientation renderer which utilizes said data on said major axis from said major/minor axis identifier to determine a feature orientation in degrees; and at least one processor configured to run the program.

\* \* \* \* \*